May 12, 1931.                J. M. BROWN                1,804,590
SWITCH MECHANISM
Filed April 12, 1926
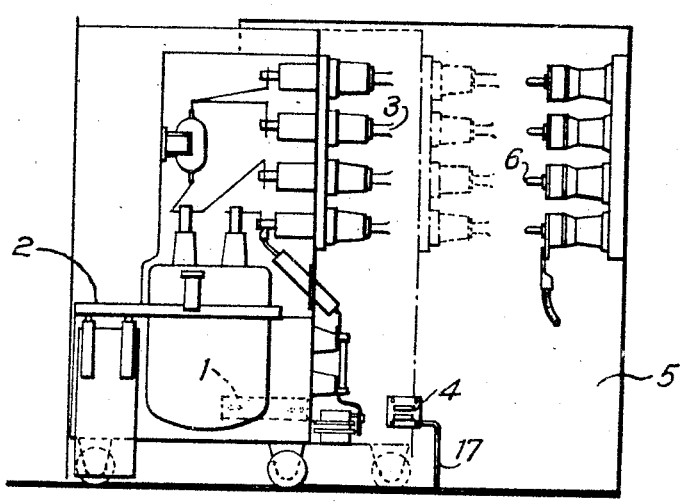
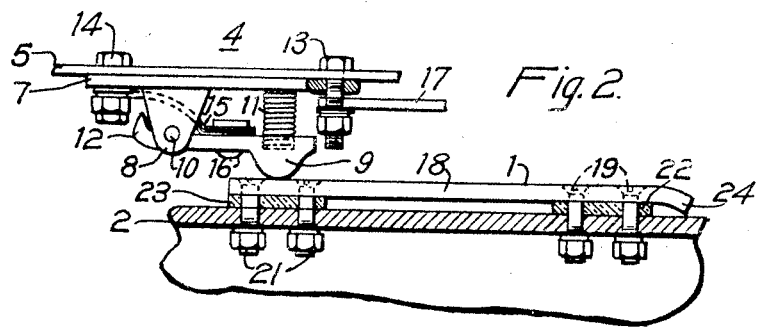
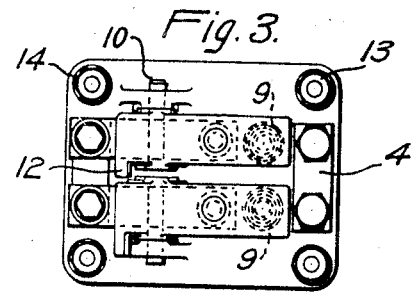
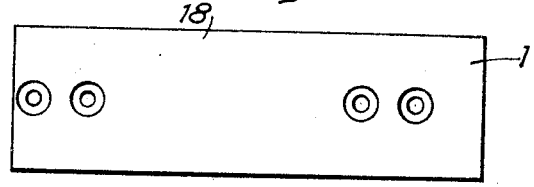
WITNESSES:
INVENTOR
James M. Brown.
BY
ATTORNEY Patented May 12, 1931

1,804,590

UNITED STATES PATENT OFFICE

JAMES M. BROWN, OF PITTSBURGH, PENNSYLVANIA, ASSIGNOR TO WESTINGHOUSE ELECTRIC & MANUFACTURING COMPANY, A CORPORATION OF PENNSYLVANIA

SWITCH MECHANISMS

Application filed April 12, 1926. Serial No. 101,356.

My invention relates to switch mechanisms and particularly to ground connections for truck type switches.

One object of my invention is to provide a ground connection for truck type switches that is adapted to remain in contact during the withdrawal of the truck from its cell until the disconnecting contact members have been separated.

Heretofore, ground connections to truck frames were made through contact members similar to the main disconnecting jaws. When the truck was withdrawn from the cell, the ground contact members became separated at approximately the same time that the main contact members opened, thereby leaving the truck frame without a proper ground connection during the withdrawal period.

My invention resides in a contact plate for mounting on the switch truck and a spring supported contact finger mechanism for mounting on the truck cell wall. The contact plate is of sufficient length to maintain contact with the grounded finger members during the withdrawal of the truck to the disconnected position. When in this position, the circuit breaker may be operated for test with assurance that the frame is properly grounded.

Fig. 1 is a longitudinal sectional view of a cell containing a truck type circuit breaker embodying features of my invention, showing the circuit breaker apparatus in elevation.

Fig. 2 is a plan view of the ground connection device of Fig. 1, showing a portion of the truck frame in section.

Fig. 3 is a view in elevation of the spring mounted contact finger mechanism shown in Fig. 1, and Fig. 4 is a view in elevation of the contact plate shown in Fig. 1.

Referring to the drawings, the ground connection device comprises in general, a contact plate 1 mounted on a circuit breaker truck 2 having main contact members 3, and a contact finger mechanism 4 mounted on a truck cell 5 having main contact members 6. The contact finger mechanism comprises the base 7 having integral bracket members 8 and contact fingers 9 that are pivotally mounted on a pin 10 that is supported by the bracket members 8. The contact finger 9 is biased in the clockwise direction by a spring 11 and restrained to movement in a limited arc by an integral stop 12 that bears against the bracket 8.

The mechanism 4 is secured to the truck cell wall by bolts 13 and 14. The bolt 14 also serves to connect one end of a laminated shunt 15 to the metal cell casing 5. The other end of the shunt 15 is electrically connected to the contact finger 9 by a rivet 16. The bolt 13 serves to secure a ground connection lead 17 to the cell casing 5.

The contact plate 1 comprises a rectangular plate 18, preferably of copper, that is mounted on the wall of the truck 2 by means of machine screws 19 and 21. The machine screws 19 serve to secure a truck ground lead 22 and the screws 21 secure a spacing member 23. One end 24 of the plate 18 is bent against the side of the truck during assembly, to provide a rounded contact surface for initially engaging the contact finger 9.

Upon moving the truck switch 2 into the cell 5 from the position shown in full lines in Fig. 1, the contact finger 9 engages the plate 18 and contact is then maintained during further movement of the truck into the cell. When the truck is withdrawn from the cell, contact is maintained between the plate 18 and the contact fingers 9 after the disconnecting contact members are separated. Thus the truck may be moved to an intermediate test position indicated in broken lines in Fig. 1 and the breaker operated with assurance that the truck frame and circuit breaker mechanism will be securely grounded. It is apparent that I have invented a truck type circuit breaker grounding connection that is adapted to maintain contact while the breaker is in an operating position and while it is in a disconnected test position.

I do not wish to be limited by the specific arrangement of parts herein set forth as it is obvious to those skilled in the art that various modifications and substitutions may be made without departing from the spirit and scope of the invention as set forth in the appended claims.

I claim as my invention:

1. In a ground connection for truck-type circuit breakers, a contact plate and cooperating finger members adapted to maintain electrical contact with the plate when the truck is in the operating position, when it is in the disconnected or test position and during movement from the one to the other position.

2. The combination with a truck-type circuit breaker having main contacts, of a frame-grounding contact member comprising a relatively long contact plate and contact fingers adapted to cooperate with said contact plates to maintain a ground connection while the truck is in operating position and for a time after the main contacts have been disengaged during the withdrawal operation.

3. The combination with a truck switch and cell therefor having cooperating main contacts, of a relatively long contact plate mounted horizontally on the truck, and contact fingers mounted on the truck cell for cooperating with the contact plates to maintain a ground connection for a time after the main contacts have been disengaged during withdrawal operation of the truck from the cell.

In testimony whereof, I have hereunto subscribed my name this 31st day of March, 1926.

JAMES M. BROWN.